United States Patent
Gorohata et al.

(10) Patent No.: US 8,132,315 B2
(45) Date of Patent: Mar. 13, 2012

(54) METHOD OF MANUFACTURING STATOR COIL

(75) Inventors: Tetsuya Gorohata, Anjo (JP); Keigo Moriguchi, Takahama (JP); Atsuo Ishizuka, Nagoya (JP)

(73) Assignee: Denso Corporation, Kariya (JP)

( * ) Notice: Subject to any disclaimer, the term of this patent is extended or adjusted under 35 U.S.C. 154(b) by 123 days.

(21) Appl. No.: 12/677,224

(22) PCT Filed: Mar. 11, 2009

(86) PCT No.: PCT/JP2009/054667
§ 371 (c)(1),
(2), (4) Date: Mar. 9, 2010

(87) PCT Pub. No.: WO2009/113576
PCT Pub. Date: Sep. 17, 2009

(65) Prior Publication Data
US 2011/0000078 A1   Jan. 6, 2011

(30) Foreign Application Priority Data
Mar. 12, 2008  (JP) .................. 2008-063273
Mar. 9, 2009   (JP) .................. 2009-055610

(51) Int. Cl.
  *H02K 15/02* (2006.01)
(52) U.S. Cl. ................. 29/596; 29/605; 29/732
(58) Field of Classification Search ............ 29/596–598, 29/605–606, 732–736; 242/328, 329, 365.3; 310/179, 187, 198, 201, 210
See application file for complete search history.

(56) References Cited

U.S. PATENT DOCUMENTS

| | | | |
|---|---|---|---|
| 5,860,615 A * | 1/1999 | Burch | 242/432.5 |
| 6,140,735 A | 10/2000 | Kato et al. | |
| 7,284,312 B2 * | 10/2007 | Oohashi et al. | 29/596 |
| 7,770,286 B2 * | 8/2010 | Hirota et al. | 29/605 |
| 2001/0019234 A1 | 9/2001 | Murakami et al. | |
| 2004/0207282 A1 | 10/2004 | Ueda et al. | |
| 2007/0180682 A1 | 8/2007 | Ueda et al. | |
| 2009/0146523 A1 | 6/2009 | Kouda et al. | |
| 2010/0000077 A1 * | 1/2010 | Akimoto et al. | 29/605 |
| 2011/0000078 A1 * | 1/2011 | Gorohata et al. | 29/596 |

FOREIGN PATENT DOCUMENTS

| | | |
|---|---|---|
| JP | 2000-139048 | 5/2000 |
| JP | 2002-176752 | 6/2002 |
| JP | 2003-324911 | 11/2003 |
| JP | 2004-320886 | 11/2004 |
| JP | 2009-131091 | 6/2009 |

OTHER PUBLICATIONS

International Search Report for PCT/JP2009/054667, mailed Jun. 2, 2009.

\* cited by examiner

*Primary Examiner* — Minh Trinh
(74) *Attorney, Agent, or Firm* — Nixon & Vanderhye PC

(57) ABSTRACT

During sending the combined body 47 to the core member 6, the pre-orientation members 81 are respectively inserted into a plurality of the consecutive clearances 472 of a plurality of the clearances 472 formed between the adjacent straight overlap sections 471 of the combined body 47. By the pre-orientation members 81, the overlap of the straight portions 431 in the straight overlap section 471 and the pitch between the straight overlap sections 471 are aligned in advance.

4 Claims, 13 Drawing Sheets

[FIG. 1]
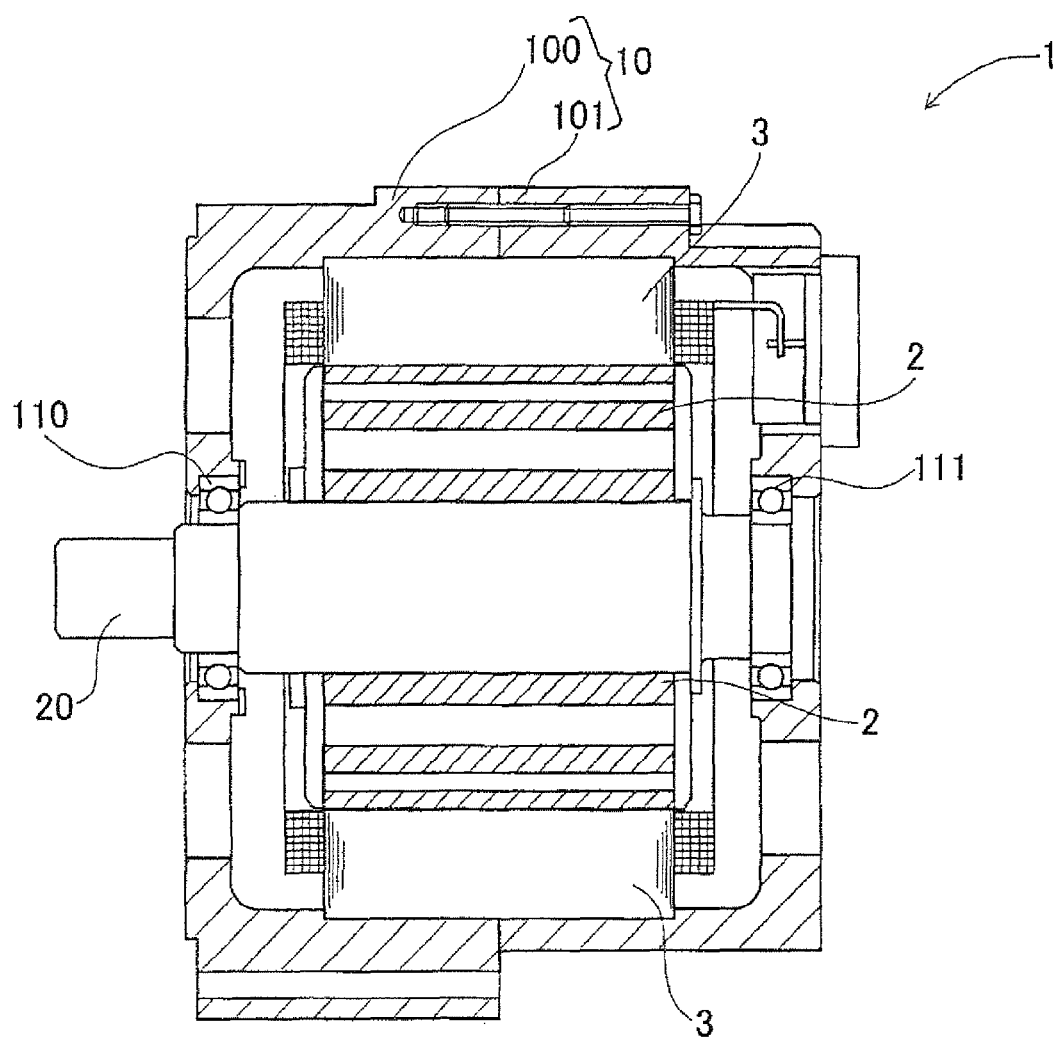

[FIG. 2]
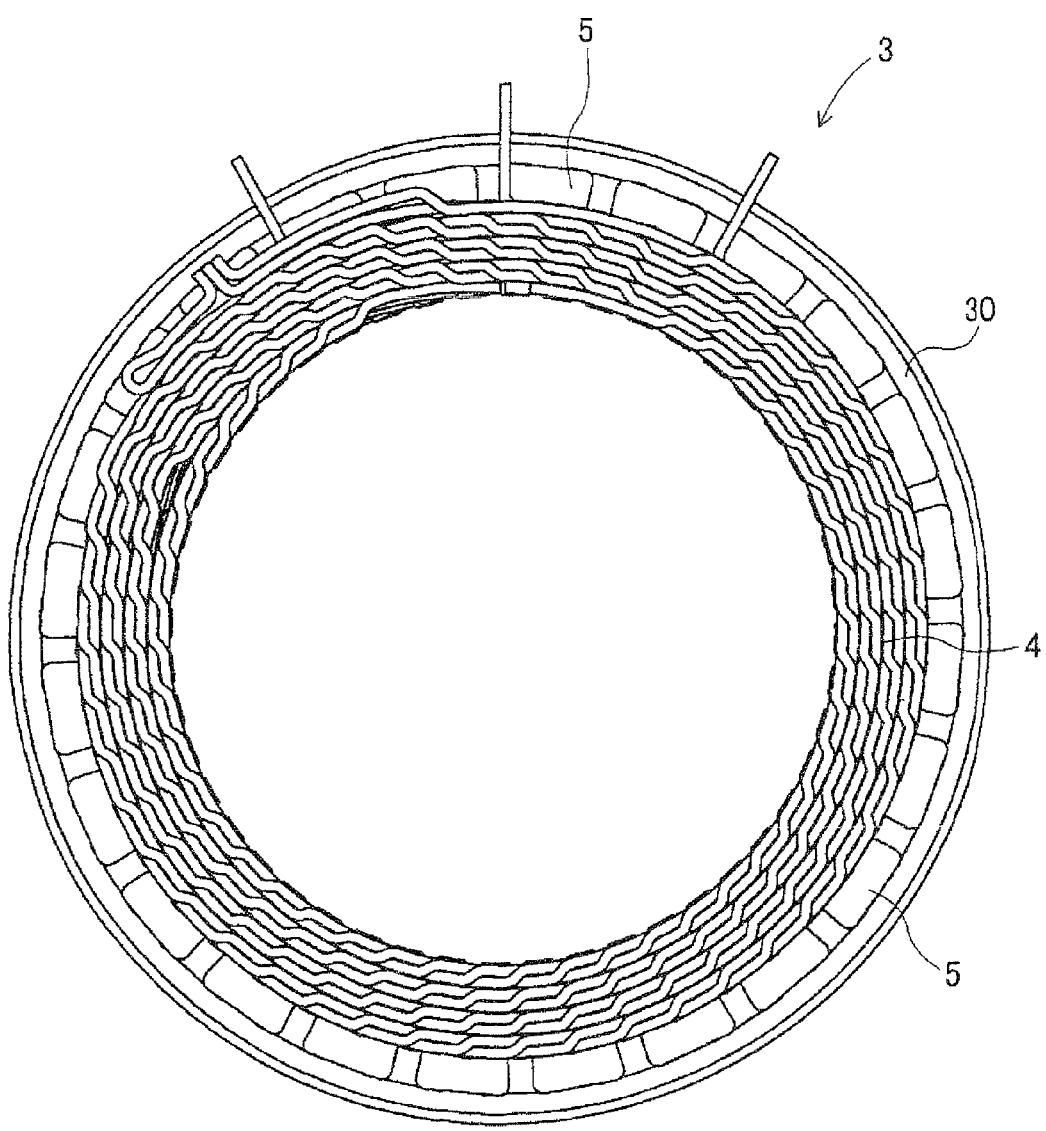

[FIG. 3]
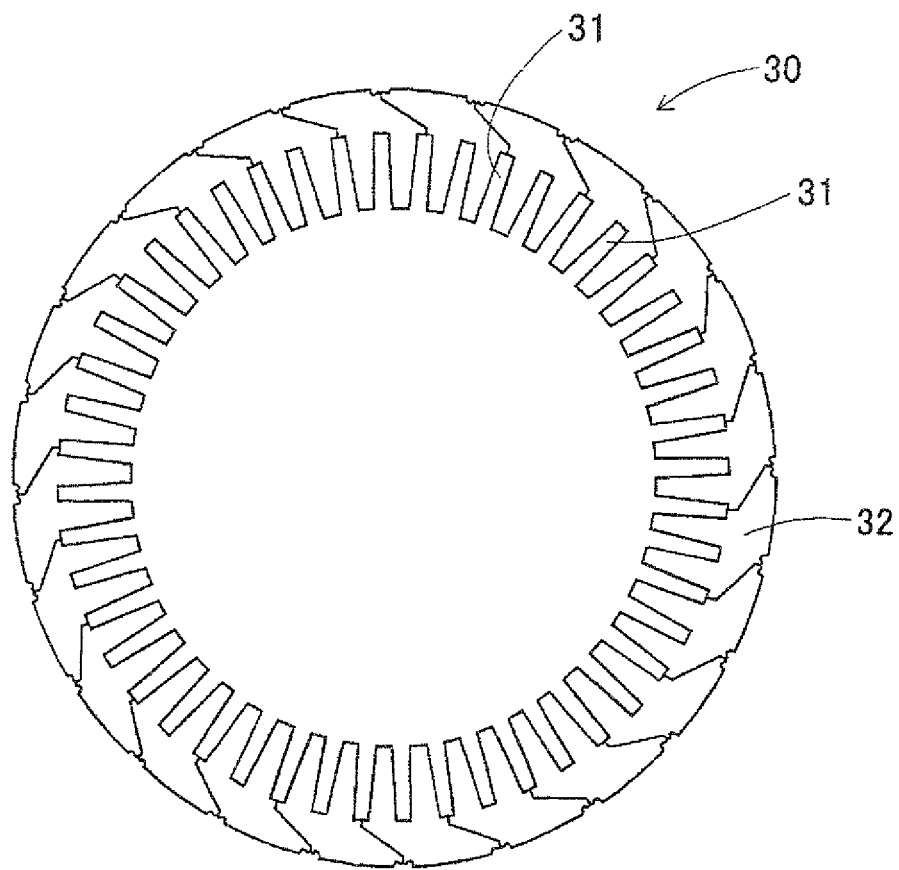
[FIG. 4]
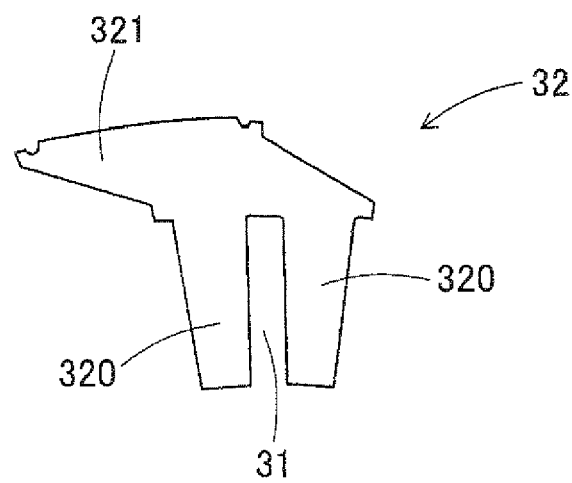

[FIG. 5]
(A)
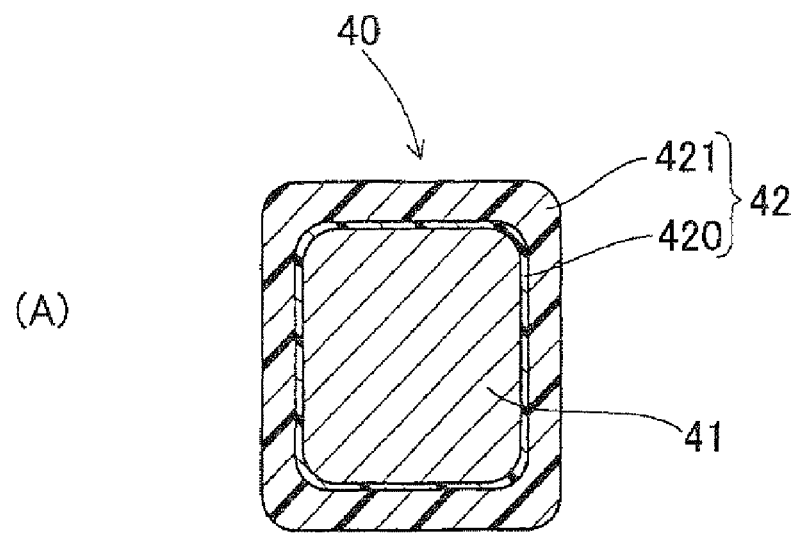
(B)
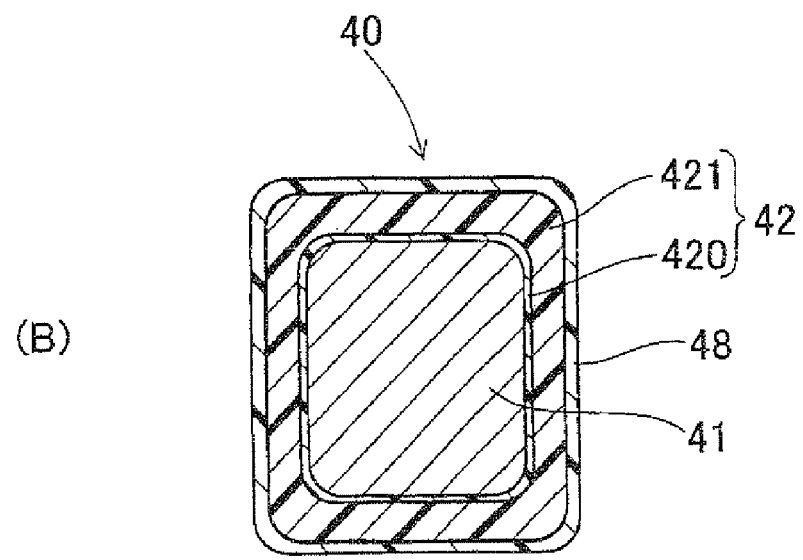

[FIG. 6]
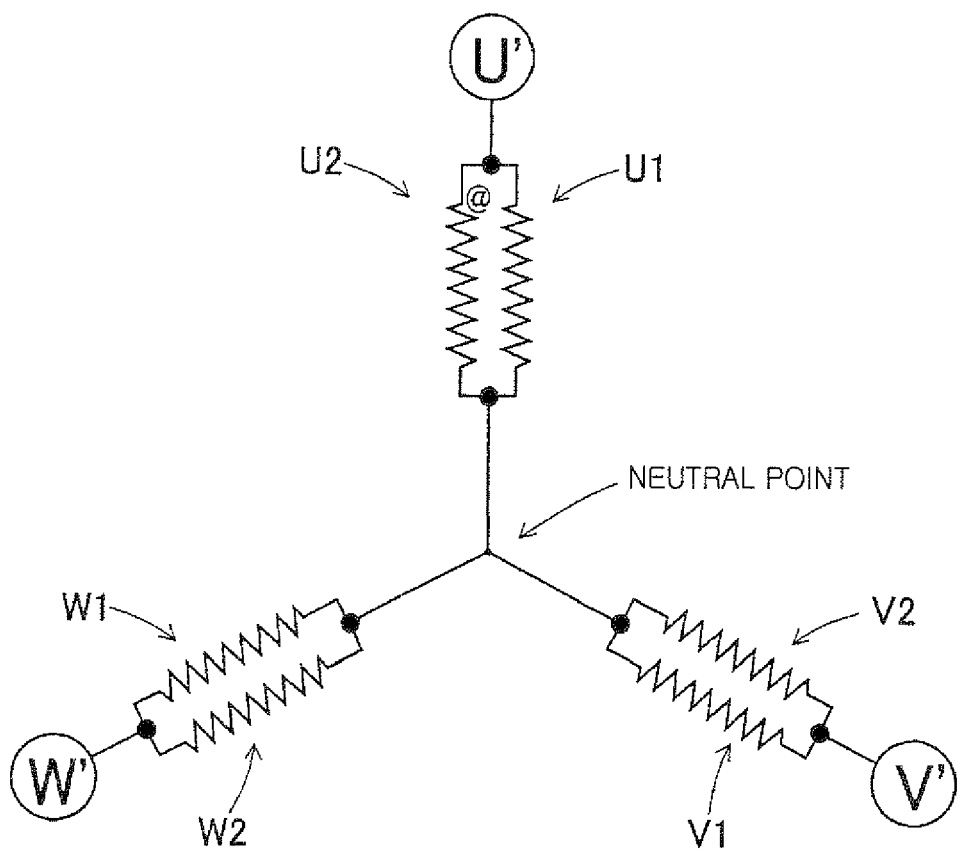

[FIG. 7]
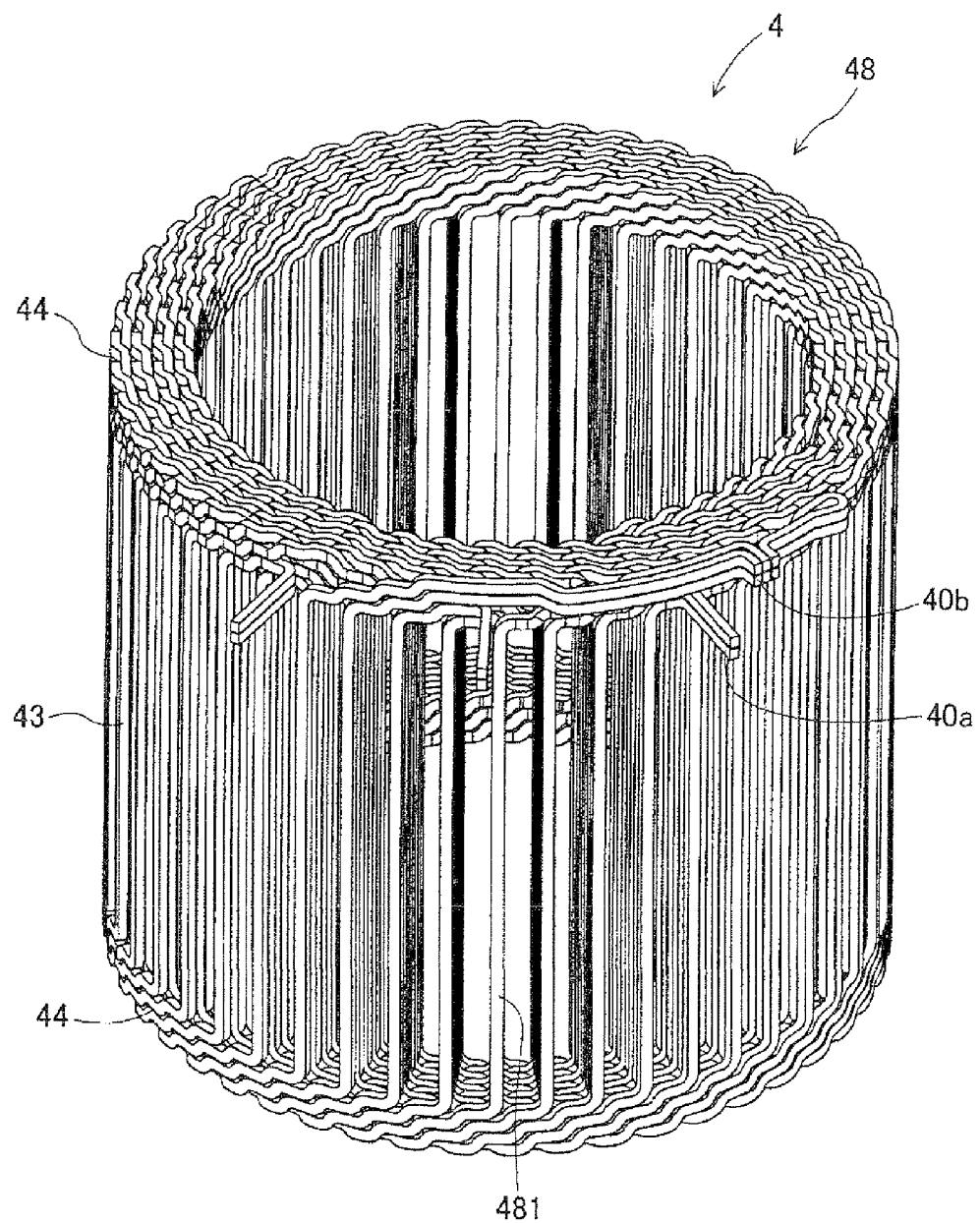

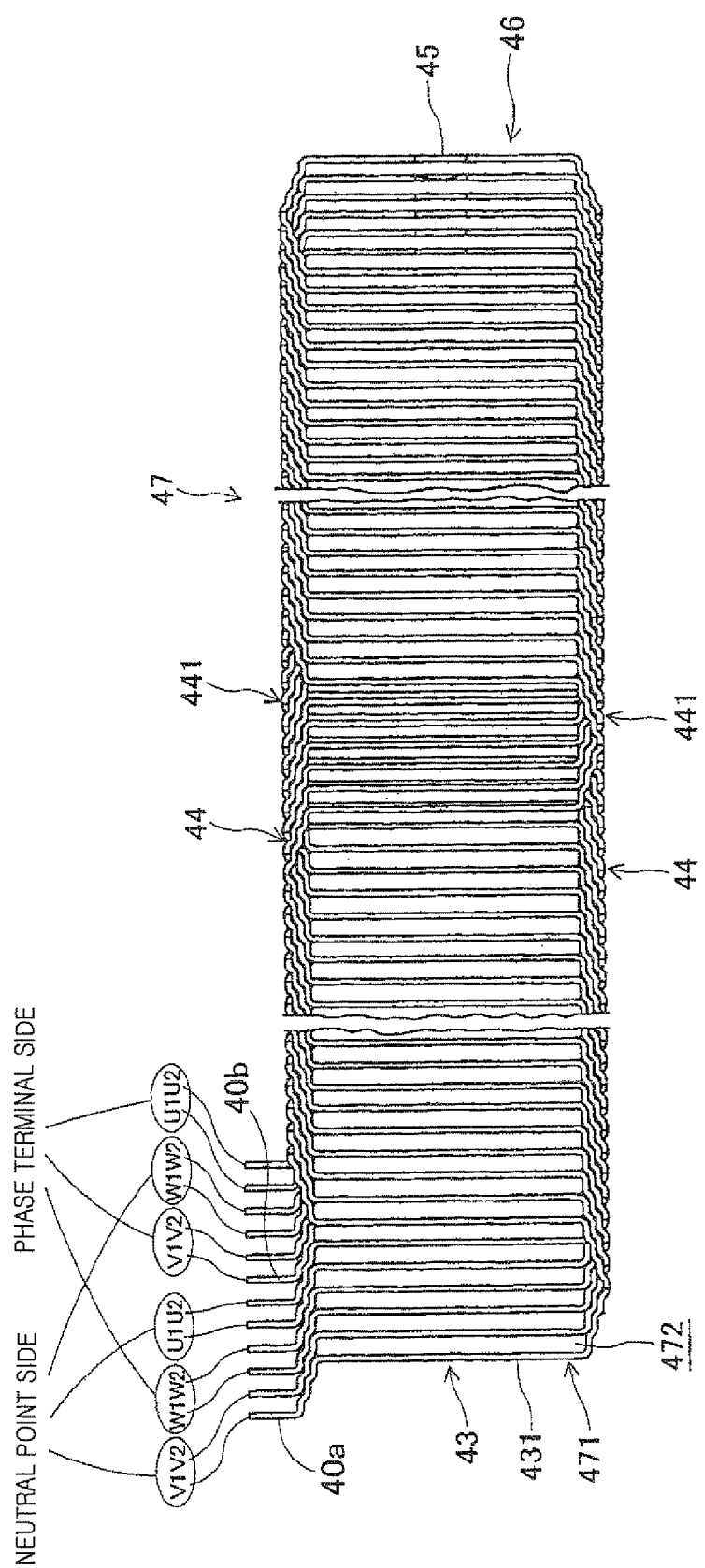

[FIG. 9]
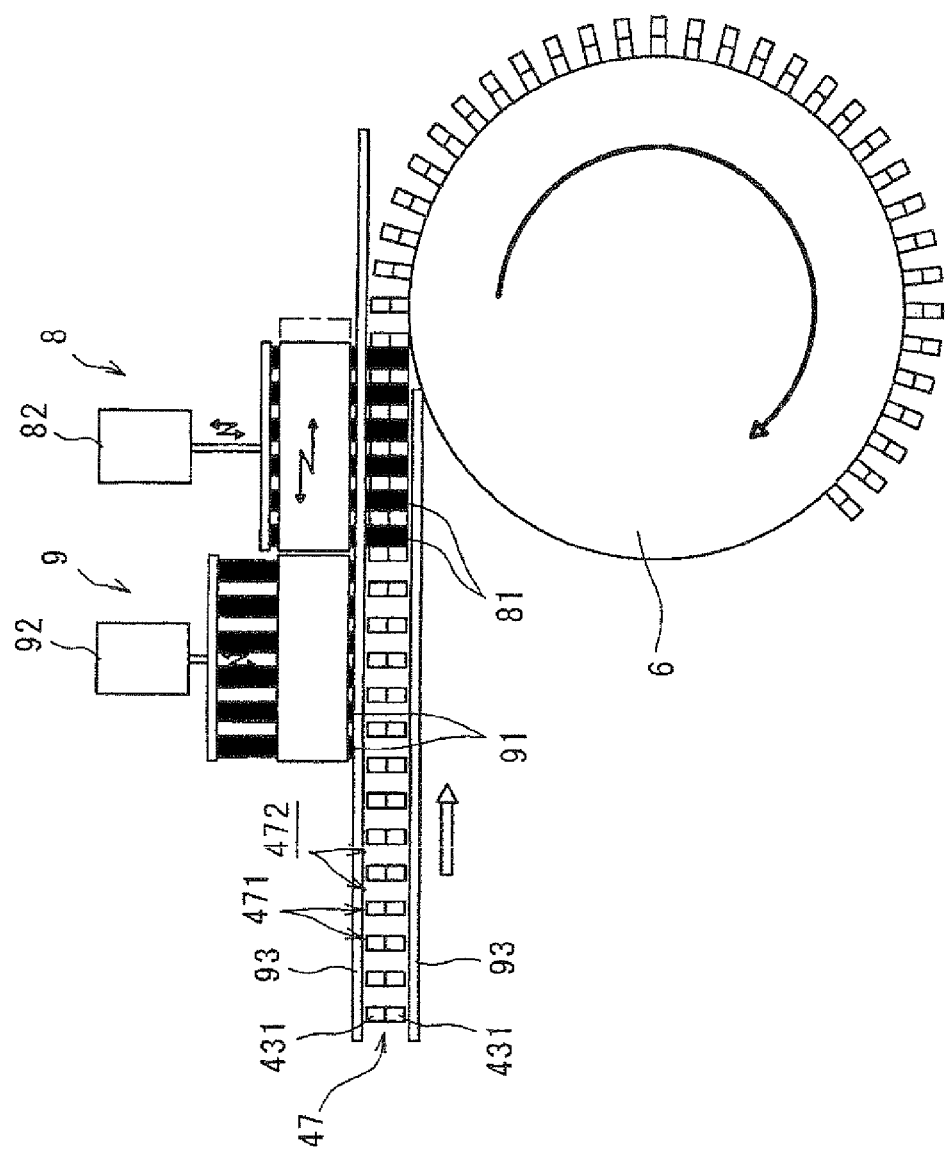

[FIG. 10]
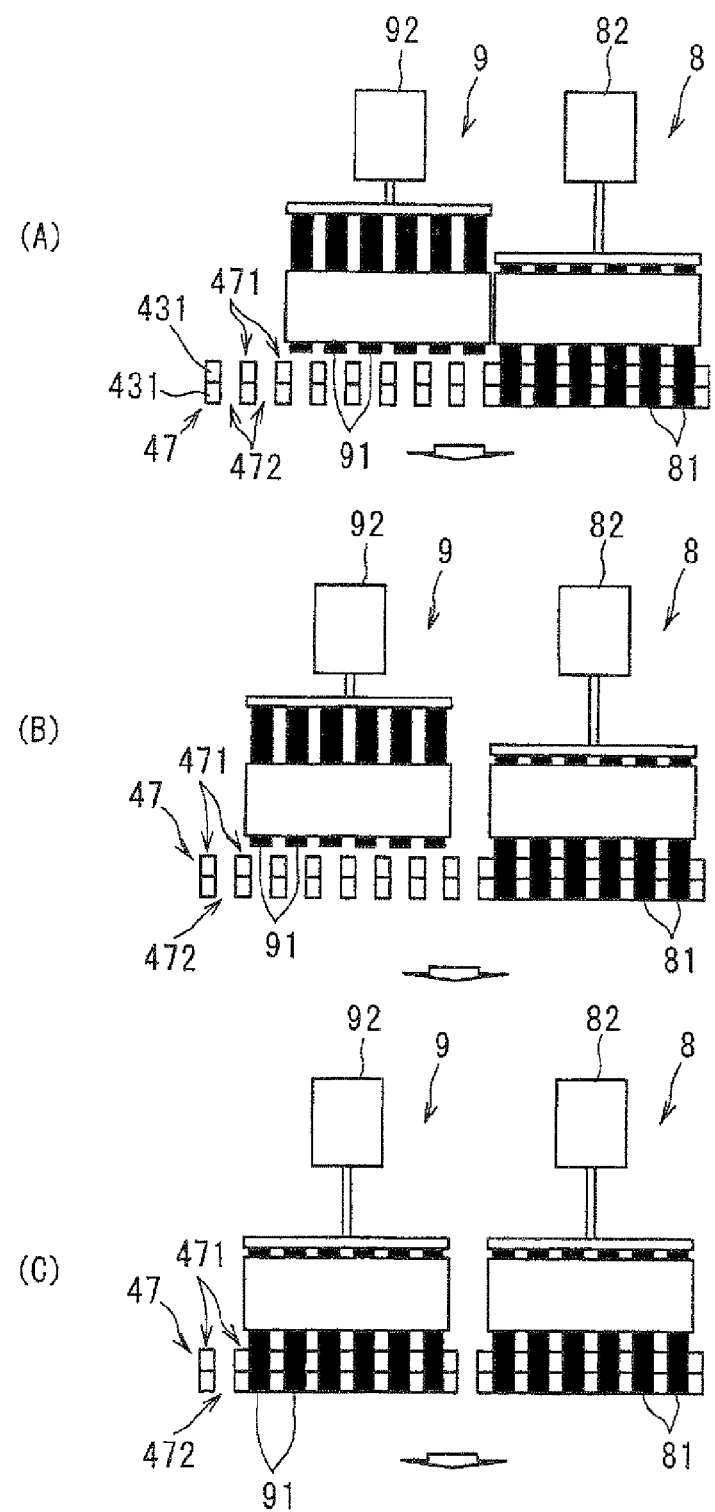

[FIG. 11]
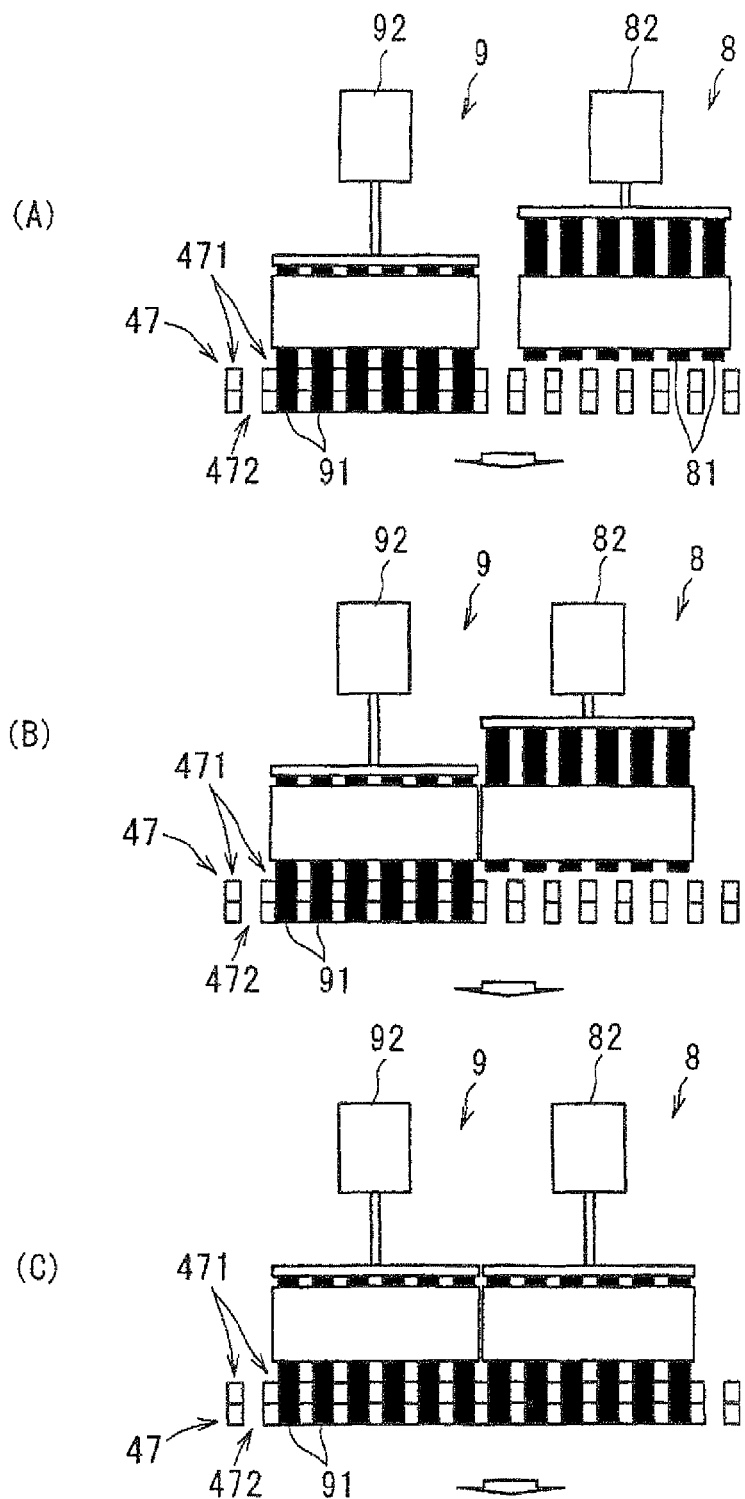

[FIG. 12]
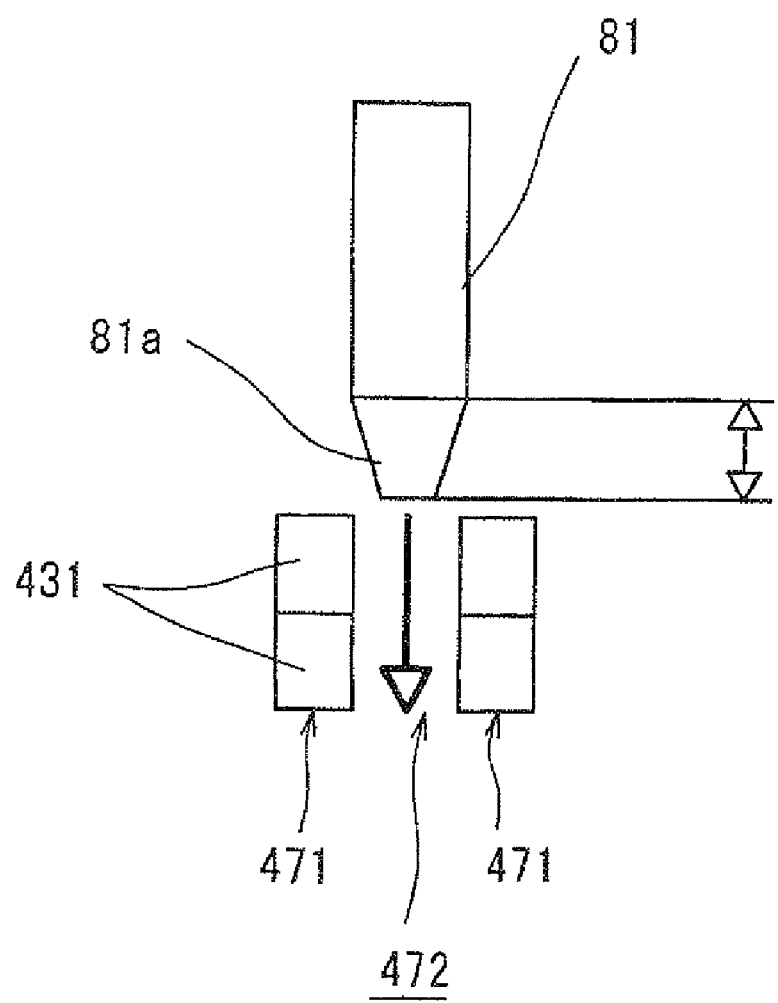

[FIG. 13]
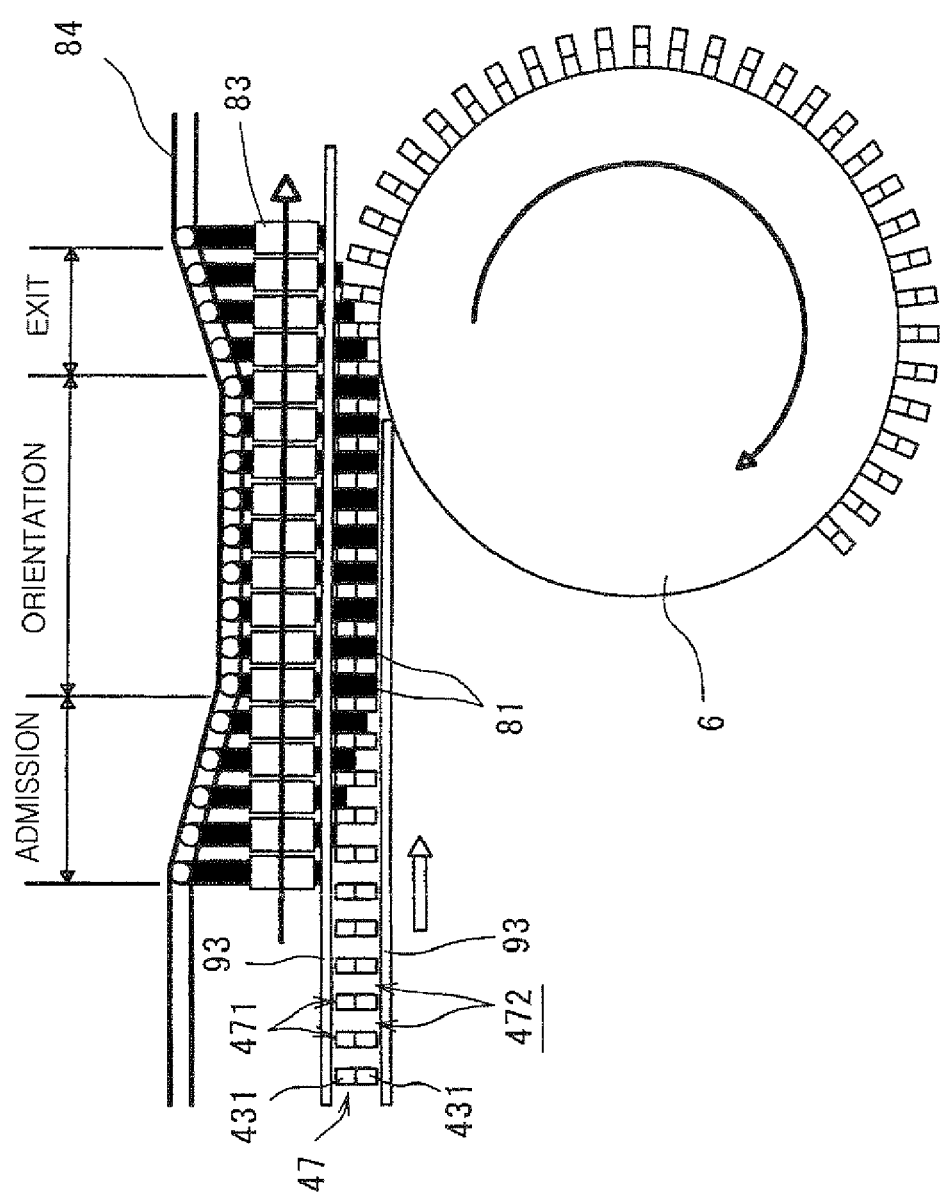

[FIG. 14]
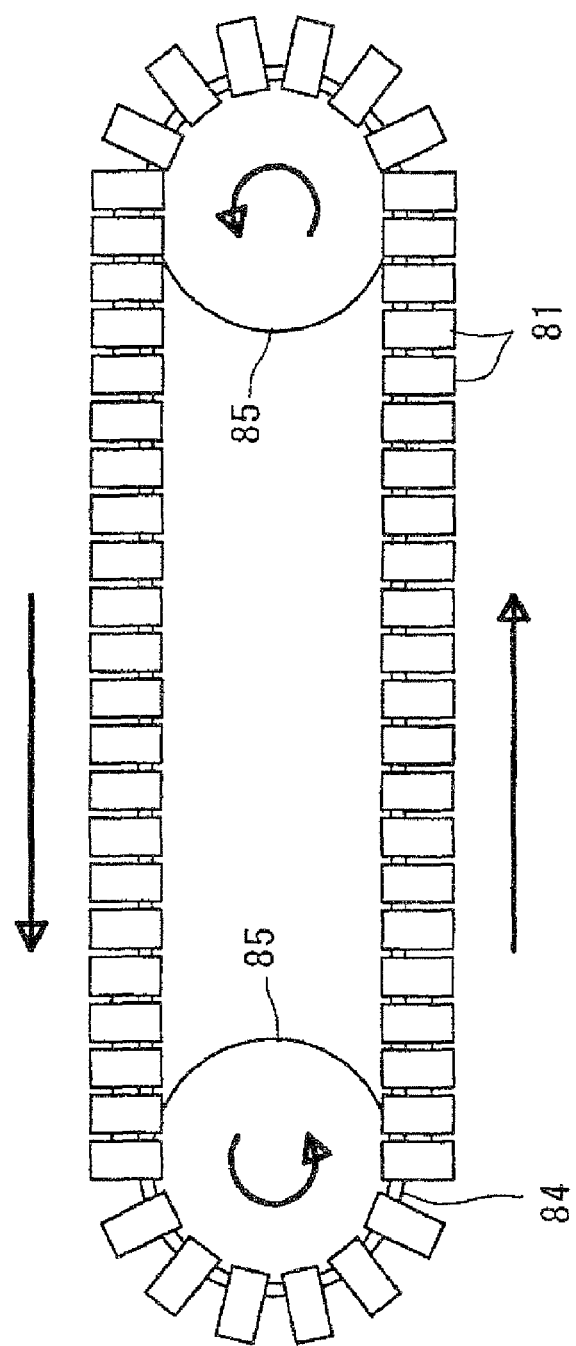

METHOD OF MANUFACTURING STATOR COIL

CROSS-REFERENCE TO RELATED APPLICATIONS

This application is the U.S. national phase of International Application No. PCT/JP2009/054667 filed 11 Mar. 2009 which designated the U.S. and claims priority to JP Patent Application Nos. 2008-063273 filed 12 Mar. 2008 and 2009-055610 filed 9 Mar. 2009, the entire contents of each of which are hereby incorporated by reference.

BACKGROUND OF THE INVENTION

1. Field of the Invention

The present invention relates to a method of manufacturing a stator coil, and more particularly, relates to a method of manufacturing a stator coil used in a stator of a rotary electric machine.

2. Background Art

In recent years, rotary electric machines used as electric motors and alternators are required to be of compact high-output and high quality.

For example, a space to install a vehicle mount rotary electric machine is becoming smaller and smaller, while on the other hand, increase of output is being required.

As a conventional rotary electric machine, there is known the one in which the stator coil used in the stator is constituted of continuous windings (For example, refer to Patent documents 1 and 2).

[Patent document 1] Japanese Patent Application Laid-open No. 2002-176752
[Patent document 2] Japanese Patent Application Laid-open No. 2004-320886

Methods of manufacturing such stator coils constituted of continuous windings includes the ones described below, for example.

First, a shaped body constituted of a plurality of parallel straight portions connected by a plurality of turn portions is formed from a plurality of electric conductor wires. Next, these shaped bodies are combined with one another to form a combined body. Each of the shaped body sets constituting the combined body includes, in the longitudinal direction of the combined body, a plurality of straight overlap sections formed of a plurality of the straight portions of one shaped body and a plurality of the straight portions of another shaped body which are respectively overlapped with each other. Accordingly, in this combined body, a plurality of the straight overlap sections are aligned in the longitudinal direction of the combined body. Next, this combined body is wound around a core member by a predetermined number of turns to form a wound body. This wound body includes, in the circumferential direction, a plurality of straight laminated sections constituted of a plurality of the straight overlap sections of one shaped body set laminated in the radial direction.

Thus obtained wound body is made as a stator coil, the respective straight laminated sections being disposed in the slots of the stator core, the respective turn portions being disposed outside the slots.

However, in the above manufacturing method, it is likely that the overlap of the straight portions in the straight overlap section of the combined body becomes out of alignment, or distances between adjacent straight overlap sections become non-uniform when the combined body is wound around the core member. Accordingly, in the obtained wound body, it is likely that the overlap of a plurality of the straight portions in the straight laminated section becomes out of alignment, or distance between the adjacent straight laminated sections becomes non-uniform. In this case, it is likely that the orientation accuracy of the respective straight portions in the slots is lowered, or distance (pitch) between the straight laminated sections disposed in the adjacent slots becomes non-uniform when the straight laminated sections of the stator coil are disposed in the slots of the stator core. Lowering of the orientation accuracy of the straight portions or non-uniformity of the pitch leads to lowering of the slot occupation factor of the stator, or the output of the rotary electric machine using this stator.

BRIEF SUMMARY OF THE INVENTION

The present invention has been made in view of the above described circumstances, and technical problem to be solved is to at least improve the orientation accuracy of the respective straight portions in the straight laminated section of the wound body at the time of manufacturing by winding a stator coil in which respective phase windings constituted of continuous windings are wound.

The present invention made to solve the above problem is a method of manufacturing a stator coil in which a plurality of phase windings are wound, comprising:

a shaping step of shaping a plurality of shaped bodies from electric conductor wires;

a combining step of combining the plurality of the shaped bodies to one another to form a combined body; and a winding step of winding the combined body around a core member to form a wound body;

wherein the shaped body includes a plurality of straight portions extending in parallel to one another and aligned along a longitudinal direction of the combined body, and a plurality of turn portions each connecting adjacent ones of the straight portions at one end side and the other end side of the straight portions in an alternating manner, each of the shaped bodies including, in the longitudinal direction of the combined body, a plurality of straight overlap sections formed of the straight portions being overlapped, the wound body obtained at the winding step includes, in a circumferential direction of the wound body, a plurality of straight laminated sections formed of the plurality of the straight overlap sections laminated in a radial direction, and in the winding step, by inserting pre-orientation members respectively into consecutive ones of a plurality of clearances formed between the straight overlap sections adjacent to each other of the combined body during sending the combined body into the core member, overlap of the straight portions in the straight overlap section caught between the pre-orientation members is aligned.

In the winding step of the stator coil manufacturing method of the present invention, during sending the combined body to the core member, the pre-orientation members are inserted respectively into consecutive ones of the plurality of the clearances formed between the straight overlap sections adjacent to each other of the combined body. At this time, in a case where the pre-orientation member is inserted into at least two consecutive clearances, respectively, it is possible to at least align the overlap of the straight portions of the straight overlap section caught between the pre-orientation members, and to orient the respective straight portions in the overlap direction in advance. Accordingly, in the wound body obtained by winding the combined body, at least the accuracy with which the straight portions of the straight laminated sections are oriented in the radial direction of the wound body can be improved. Further, in a case where the pre-orientation members are inserted into at least three consecutive clearances, respectively, it is possible to align the overlap of the straight portions of the straight overlap section caught between the pre-orientation members to orient the respective straight portions in the overlap direction in advance, and also to align the size of the clearance between the straight overlap sections adjacent to each other in advance. Accordingly, in the wound body obtained by winding this combined body, the accuracy with which the straight portions of the straight laminated section are oriented in the radial direction of the wound body can be improved, and also the pitch accuracy between the straight laminated sections adjacent to each other can be improved.

The winding step is a continuous winding step in which the combined body is continuously sent to the core member. In this continuous winding step, it is preferable to cause the pre-orientation members to enter and exit with respect to the clearances while moving the pre-orientation members in synchronization with the combined body.

According to this structure, it is possible to improve the orientation accuracy of the respective straight portions in the straight laminated section of the wound body, and the pitch accuracy between the adjacent straight laminated sections in the case of forming the wound body by continuous winding.

The winding step is a pitch-by-pitch winding step to wind the combined body around the core member while sending the combined body to the core member interval by interval between the adjacent straight overlap sections. In this pitch-by-pitch winding step, it is preferable to repeat a pre-orientation member inserting step to insert the pre-orientation members into the clearances of the combined body at rest, a forward moving step to move forwardly the combined body together with the pre-orientation members by the interval between the adjacent straight overlap sections, a pre-orientation member extracting step to extract the pre-orientation members from the clearances of the combined body, and a backward moving step to move backward the pre-orientation members by the interval between the adjacent straight overlap sections.

According to this structure, it is possible to improve the orientation accuracy of the respective straight portions in the straight laminated section of the wound body, and the pitch accuracy between the adjacent straight laminated sections in the case of forming the wound body by pitch-by-pitch winding.

In the pitch-by-pitch winding step, it is preferable to perform a position holding member inserting step to insert position holding members into the clearances other than the clearances into which the pre-orientation members are inserted after the forward moving step, perform a position holding member extracting step to extract the position holding members from the clearances of the combined body after the pre-orientation member inserting step, perform the pre-orientation member extracting step, the backward moving step and the pre-orientation member inserting step in a state that the position holding members are inserted into the clearances, and perform the forwarding moving step in a state that the position holding members have been extracted from the clearances.

According to this structure, in the case of forming the wound body by pitch-by-pitch winding, the combined body is sent to the core member by the amount of one pitch after the pre-orientation members are inserted into the clearances of the combined body to pre-orient the respective straight portions in the straight overlap section. Next, in a state that the pre-orientation members are inserted into the clearances of the combined body, the position holding members are inserted into other clearances. Next, in a state that the position of the combined body is held by the position holding members, the pre-orientation members are extracted from the combined body, and the extracted pre-orientation members are moved backward by the amount of one pitch to be inserted into the next clearances. Accordingly, the pre-orientation members can be inserted into the next clearances easily.

Accordingly, according to the stator coil manufacturing method of the present invention, it is possible to at least improve the orientation accuracy of the respective straight portions in the straight laminated section of the wound body, or improve the orientation accuracy of the respective straight portions in the straight laminated section of the wound body while improving the pitch accuracy between the adjacent straight laminated sections at the time of manufacturing, by winding, a stator coil in which respective phase windings formed of continuous windings are wound.

Accordingly, when the stator coil obtained by the stator coil manufacturing method of the present invention is applied to a stator of a rotary electric machine, it is possible to house the straight laminated sections of the wound body in the respective slots of the stator core, and as a result, the slot occupation factor in the stator and the output of the rotary electric machine using this stator can be improved.

Further, since the straight laminated sections of the wound body can be housed in the respective slots of the stator core easily, also the yield of the stators can be improved.

BRIEF DESCRIPTION OF THE DRAWINGS

FIG. 1 is an axial cross-sectional view schematically showing the structure of a rotary electric machine according to Embodiment 1.

FIG. 2 is a plan view of a stator according to Embodiment 1.

FIG. 3 is a plan view of a stator core according to Embodiment 1.

FIG. 4 is a plan view of a laminated core piece according to Embodiment 1.

FIG. 5 is a cross-sectional view of a winding constituting a stator coil according to Embodiment 1.

FIG. 6 is a diagram showing wiring of the stator coil according to Embodiment 1.

FIG. 7 is a perspective view of a wound body making the stator coil according to Embodiment 1.

FIG. 8 is a development view of the stator coil according to Embodiment 1, and a plan view of a combined body.

FIG. 9 is a diagram schematically showing a stator coil manufacturing method according to Embodiment 1.

FIG. 10 is a diagram showing the stator coil manufacturing method according to Embodiment 1, and schematically showing the operations of pre-orientation members and position holding members.

FIG. 11 is a diagram showing the stator coil manufacturing method according to Embodiment 1, and schematically showing the operations of the pre-orientation members and the position holding members.

FIG. 12 is a diagram showing the stator coil manufacturing method according to Embodiment 1, and a side view showing the front end shapes of the pre-orientation members and the position holding members.

FIG. 13 is a diagram schematically showing a stator coil manufacturing method according to Embodiment 2.

FIG. 14 is a diagram showing the stator coil manufacturing method according to Embodiment 2, and a diagram schematically showing a structure for moving the pre-orientation members in a belt-conveyor manner by sending rollers.

DETAILED DESCRIPTION OF THE INVENTION

Hereinafter, embodiments of the stator coil manufacturing method of the invention are explained in detail. Incidentally, the embodiments explained are absolutely merely implementation examples, and the stator coil manufacturing method of the present invention is not limited to the below-described embodiments. The stator coil manufacturing method of the present invention can be implemented in various forms with modifications and improvements which those skilled in the art can make within the scope not exceeding the gist of the present invention.

Embodiment 1

First, the structure of a rotary electric machine 1 using a stator coil obtained by the stator coil manufacturing method of the present invention is explained.

As shown in FIG. 1, this rotary electric machine 1 includes a housing 10 constituted by a pair of housing members 100 and 101 each having a roughly bottomed tubular shape and joined to each other at their opening portions, a rotating shaft 20 rotatably supported by the housing 10 through bearings 110 and 111, a rotor 2 fixed to the rotating shaft 20, and a stator 3 fixed to the housing 10 at a position surrounding the rotor 2 inside the housing 10.

The rotor 2 is formed with a plurality of magnetic poles by permanent magnets which differ alternately along the circumferential direction in the outer periphery of the rotor 2 facing the inner periphery of the stator 3. The number of the magnetic poles of the rotor 2 differs depending on a rotary electric machine, and accordingly is not limited. In this embodiment, a rotor of 8 poles (N poles: 4, S poles: 4) is used.

As shown in FIG. 2, the stator 3 has a structure including a stator core 30, a stator coil 4 formed of a plurality of respective phase windings, and insulating paper 5 disposed between the stator core 30 and the stator coil 4.

As shown in FIG. 3, the stator core 30 has a shape of a circular ring formed with slots 31 at its inner periphery. The slots 31 are formed such that their depth directions coincide with the radial direction. The number of the slots 31 formed in the stator core 30 is in the proportion of two slots per phase of the stator coil 4 with respect to the number of the poles of the rotor 2. In this embodiment, the number of the slots is 48 by 8×3×2=48.

The stator core 30 is formed of a predetermined number (24, in this embodiment) of core pieces 32 shown in FIG. 4 coupled in the circumferential direction. The core piece 32 has such a shape as to define one slot 31, and define one slot 31 with the circumferentially adjacent core piece 32. In more detail, the core piece 2 includes a pair of teeth portions 320 extending radially inward, and a back core portion 321 connecting the teeth portions 320 at radially outside.

The core piece 32 constituting the stator core 30 is formed of 410 laminated electromagnetic steel plates having a thickness of 0.3 mm. Incidentally, between the laminated electromagnetic steel plates, insulating paper is disposed. The core piece 32 constituting the stator core 30 may be formed of conventionally known metal thin plates and insulating films, not only of this laminated body of electromagnetic steel plates.

The stator coil 4 is made of a plurality of windings 40 wound in a given way. As shown in FIG. 5(A), the winding 40 is formed of a copper conductor 41 and an insulating film 42 constituted of an inner layer 420 and an outer layer 421 covering the outer surface of the conductor 41 to insulate the conductor 41. The thickness of the insulating film 42 in combination with the inner layer 420 and the outer layer 421 is set between 100 μm and 200 μm. As above, since the thickness of the insulating film 42 constituted of the inner layer 420 and the outer layer 421 is thick, it is not necessary to interpose insulating paper or the like between the windings 40 for insulation between the windings 40, however, insulating paper may be disposed between the windings 40, or between the stator core 30 and the stator coil 40 as shown in FIG. 2.

As shown in FIG. 5(B), the outer surface of the insulating film 42 constituted of the inner layer 420 and the outer layer 421 may be coated with a fusion member 48 made of fusion material such as epoxy resin. In this case, since the fusion member 48 melts more quickly than the insulating film 42 by the heat generated by the rotary electric machine 1, a plurality of the windings 40 accommodated in the same slot 31 heat-adhere to one another by their fusion members 48. As a result, since the plurality of the windings 40 accommodated in the same slot 31 become integrated and rigid, the mechanical strength of the windings 40 in the slot 31 increases.

As shown in FIG. 6, the stator coil 4 is formed of two sets of three-phase windings (U1, U2, V1, V2, W1, W2).

As shown in FIG. 7, the stator coil 4 is constituted of a plurality of the windings 40 wound in a predetermined shape. The winding 40 constituting the stator coil 40 is shaped in the shape wave-wound along the circumferential direction on the side of the inner periphery of the stator core 30.

The winding 40 constituting the stator coil 4 includes in-slot portions 43 of a linear shape accommodated in the slots 31, and turn portions 44 connecting the adjacent in-slot portions 43 to each other. The in-slot portions 43 are accommodated in every predetermined number of the slots 31 (in this embodiment, 3 phases×2=6). The turn portions 44 are formed projecting from the axial end faces of the stator core 30.

The stator coil 4 is formed in a state that both ends of the windings 40 are caused to project from the axial end faces, and the windings 40 are wound in waves along the circumferential direction. One phase of the stator coil 4 is formed by joining the ends of a first winding section 40a and a second winding section 40 to each other by welding. That is, one phase of the stator coil 4 is formed of one combined body formed by joining the ends of two shaped bodies shaped from two electric conductor wires. The in-slot portions 43 of the first winding section 40a and the in-slot portions 43 of the second winding section 40b are accommodated in the same slots 31. At this time, the in-slot portions 43 of the first winding section 40a and the in-slot portions 43 of the second winding section 40b are disposed such that they alternate in the depth direction in the slots 31. A joint portion 45 at which the first and second winding sections 40a and 40b are joined to each other is formed in a turn-round portion 46 constituted of the in-slot portion 43 at which the directions along which the first and second winding sections 40a and 40b are wound turn round.

As shown in the development view of the stator coil 4, that is, as shown in the plan view of the combined body 47 before being wound shown in FIG. 8, the stator coil 4 includes 6 sets of combination bodies constituted of the first winding section 40a and the second winding section 40b different in their winding directions. The six sets of the combination bodies make three-phase (U,V,W)×2 (double slot) coils. In each of the combination bodies, the end of the first winding section 40a on the side of the neutral point (or its phase terminal) and the end of the second winding section 40b on the side of its phase terminal (or the neutral point) are connected to each other through the in-slot portion 43 constituted of the turn-round portion 46. The wiring methods of the windings 40 of the respective phases are the same.

Hereinafter, the stator coil manufacturing method of Embodiment 1 is explained. That is, the stator coil 4 is manufactured in the following way.

Incidentally, in the following explanation, radial direction means the radial direction of the core member or the wound body, and circumferential direction means the circumferential direction of the core member or the wound body.

<Shaping Step>

First, 12 shaped bodies are shaped from 12 electric conductor wires. Each of the shaped bodies shaped here includes a plurality of straight portions 431 extending in parallel and aligned in the longitudinal direction of the shaped body, a plurality of turn portions 441 connecting the straight portions adjacent to each other at one end side and the other end side of the straight portions in an alternating manner.

<Combining Step>

The combined body 47 is formed by combining 12 shaped bodies 47 to one another. In this combined body 47, 6 sets of the combination bodies are aligned in parallel in the longitudinal direction of the combined body 47.

Each of the combination bodies is constituted of a first wire section making the first winding section 40a, and a second wire section making the second winding section 40b. Incidentally, the first wire section is constituted of one shaped body, and also the second wire section is constituted of one shaped body.

An end of the first wire section and an end of the second wire section in each combination body are joined to each other by welding to make the joint portion 45. Incidentally, an end of the first wire section and an end of the second wire section in each combination body may be joined to each other after 12 shaped bodies are combined to one another, or 6 combination bodies may be combined to one another after these 6 combination bodies are formed by joining ends of the first wire sections and ends of the second wire sections to each other.

Each of the combination bodies in the combined body 47 includes, along the longitudinal direction of the combined body 47, a plurality of the straight overlap sections formed of the straight portions 431 of the first wire section and a plurality of the straight portions 431 of the second wire section which are overlapped respectively.

<Winding Step>

The winding body 48 is formed by winding the combined body 47 by a predetermined number of turns (three turns, for example) with the turn-round portions being located on the axial center side. The wound body 48 includes, along the circumferential direction of the wound body 48, a plurality of straight laminated sections 481 formed of a plurality of the straight overlap sections 471 of one combination body laminated in the radial direction by the number of the winding turns. In each of the straight laminated sections 481, the straight portions 431 as many as twice the number of the winding turns are overlapped with one another and aligned in a line along the radial direction. Here, the respective straight laminated sections 481 are located with small intervals along the circumferential direction of the wound body 48.

With respect to the thus obtained wound body 48, the teeth portions 320 of the core pieces 32 are inserted into the clearances between each adjacent straight laminated sections 481 from the radially outside, and the each adjacent core pieces 32 are joined to each other to make the stator 3.

Next, the winding step in the stator coil manufacturing method of Embodiment 1 is explained in detail with reference to FIGS. 9 to 12.

The winding step in the stator coil manufacturing method of Embodiment 1 is a pitch-by-pitch winding step. In this pitch-by-pitch winding step, the combined body 47 is wound around the core member (core metal) 6 of a cylindrical shape, while the combined body 47 is sent to the core member 6 pitch by pitch (by the interval between the adjacent straight overlap sections). At this time, in this embodiment, the overlap of the straight portions 431 in the straight overlap section 471 of the combined body 47 is aligned in advance during sending the combined body 47 to the core member 6, and also the size of the clearances 472 between each adjacent straight overlap sections 471 is aligned in advance.

The sending of the core member 6 by the rotation of the core member 6 (the rotation in the clockwise direction in FIG. 9) and the horizontal movement of the combined body 47 (the horizontal movement from left to right in FIG. 9) can be performed by a not-shown common driving device and a control apparatus to control this.

The combined body 47 is wound around the core member 6 by 3 turns, for example, to make the wound body 3.

A pre-orientation device 8 includes a plurality of (6, in this embodiment) pre-orientation members 81, and a pre-orientation member driving device 82. The pre-orientation member driving device 82 moves all the pre-orientation members 81 forward or backward at the same time. Incidentally, each of the pre-orientation members 81 may be provided with the pre-orientation member driving device to move the pre-orientation members 81 forward or backward individually. The forward or backward direction of the pre-orientation members 81 coincides with the overlap direction of the straight portions 431 in the straight overlap section 471 of the combined body 47 being sent to the core member 6.

These pre-orientation member 81 and pre-orientation member driving device 82 are made possible to move forward and backward in parallel with the sending direction of the combined body 47 by a not-shown horizontally-driving device. The amount of forward movement (or backward movement) at this time is equivalent to the interval between the adjacent straight overlap sections 471 in the combined body 47, that is, the magnitude of one pitch. The forward movement of the pre-orientation members 81 and the pre-orientation member driving device 82 (the movement in the sending direction of the combined body 47) is performed in synchronization with the sending of the combined body 47 at the same speed.

A position holding device 9 includes a plurality of (6, in this embodiment) position holding members 91, and a position holding member driving device 92. The position holding member driving device 92 moves all the position holding members 91 forward and backward at the same time. Incidentally, each of the position holding members 91 may be provided with the position holding member driving device to move the position holding members 91 forward or backward individually. The forward or backward direction of the position holding members 91 coincides with the overlap direction of the straight portions 431 in the straight overlap section 471 of the combined body 47 being sent to the core member 6.

Upper and lower orientation plates 93 make uniform the thickness of the combined body 47 (the thickness in the overlap direction of the straight portions 431) being sent to the core member 6 at the turn portions 441.

Here, the pre-orientation member 81 has the thickness (the thickness in the sending direction of the combined body 47) approximately equivalent to the magnitude of the clearance between the adjacent straight overlap sections 471 in the combined body 47. Accordingly, the overlap of the straight portions 431 in the straight overlap section 471 can be aligned, and oriented in the overlap direction, because the pre-orientation members 81 are inserted in to the clearances 472, and the straight overlap section 471 is caught between the pre-orientation members 81.

As above, to orient the straight portions 431 in the straight overlap section 471 in the overlap direction, at least two pre-orientation members 81 are needed. Further, when three or more pre-orientation members 81 are available, it is possible to align the interval between the two straight overlap sections 471 present between the pre-orientation members 81 on both outer sides. Accordingly, it is preferable that the number of the pre-orientation members 81 is 3 or more. However, in view of improving the orientation accuracy of the straight portions 431 in the straight overlap section 471 and the pitch accuracy between the straight overlap sections 471, it is preferable that the number of the pre-orientation members 81 is n/2 or more when the number of the straight overlap sections 471 in the combined body 47 is n.

The position holding member 91 has a width slightly smaller than the width of the pre-orientation member 81. That is, the position holding member 91 has a width slightly smaller than the size of the clearance 472 in the combined body 47. Accordingly, when the position holding members 91 are inserted into the clearances 472 with respect to the combined body 47 having been sent prior to the pre-orientation members 81, the insertion becomes easy.

Further, as shown in FIG. 12, in view of further improving the insertion easiness of the pre-orientation members 81 and the position holding members 91, the front end portion 81a of the pre-orientation member 81 and the position holding member 91 are made in such shapes that their widths become smaller toward their ends.

The pre-orientation member 81 and the position holding member 91 are made of a rectangular parallelepiped having a rectangular cross-section corresponding to the shape of the clearance 472 in the combined body 47. However, instead of one pre-orientation member 81 (or position holding member 91) made of a rectangular parallelepiped, a plurality of pre-orientation members (or position holding members) of a cylindrical shape, for example, may be used.

By controlling the pre-orientation member driving device 82, position holding member driving device 92, horizontally driving device, rotary driving device of the core member 6, and sending driving device of the combined body 47 by the control apparatus, it is possible to perform winding of the combined body 47 as below.

<Position Holding Member Inserting Step>

By the sending driving device, the sending is performed until the front winding end of the combined body 47 abuts (or is about to abut) against the core member 6. After the sending of the combined body 47 is stopped, the position holding members 91 are inserted into the clearances 472 of the combined body 47 (the state shown in FIG. 11 (B)). By this, the combined body 47 is positioned at a predetermined position.

<Pre-Orientation Member Inserting Step>

The pre-orientation members 81 are inserted into the clearances 472 of the combined body 47 held at the predetermined position by the position holding members 91 (see FIG. 11 (C)). By this, it is possible to orient the straight portions 431 in the straight overlap section 471 on the side of the front winding end of the combined body 47 in the radial direction, and to align the intervals between the straight overlap sections 471.

<Position Holding Member Extracting Step>

Thereafter, the position holding members 91 are extracted from the clearances 472 of the combined body 47 (see FIG. 10(A)).

<Forward Moving Step>

Thereafter, the combined body 47 is moved forward with respect to the core member 6 by one pitch with the pre-orientation members 81 kept being inserted into the clearances 472 (see FIG. 10 (B)). By this, the front winding end of the combined body 47 is wound around the core member 6 by the amount of one pitch.

After the combined body 47 moves forward by the amount of one pitch, a first orientation bridge 71 as orientation members 7 is inserted into the clearances 472 in the front end of the combined body 47 which begins to be wound around the core member 6. At this time, since the straight portions 431 have been oriented and also the pitch has been aligned in advance by the pre-orientation members 81, the insertion of the first orientation bridge 71 into the clearances 472 can be performed easily.

<Position Holding Member Inserting Step>

Thereafter, the position holding members 91 are inserted into other clearances 472 (for example, clearances distant from the clearances 472 into which the pre-orientation members 81 are inserted by one pitch to the side opposite to the sending direction) of the combined body 47 kept in the state that the pre-orientation members 81 are inserted into the clearances 472 (see FIG. 10 (C)).

<Pre-Orientation Member Extracting Step>

Thereafter, the pre-orientation members 81 are extracted from the combined body 47 kept in the state that the position holding members 91 are inserted into the clearances (see FIG. 11 (A)).

<Backward Moving Step>

Thereafter, the pre-orientation members 81 are moved backward to the side opposite to the sending direction by one pitch (see FIG. 11 (B)

<Repetition of the Pre-Orientation Member Inserting Step to the Backward Moving Step>

Thereafter, the above pre-orientation member inserting step to insert the pre-orientation members 81 into other clearances 472 (for example, the clearances adjacent to the clearances 472 into which the position holding members 91 are inserted) of the combined body 47 with the position holding members 91 kept being inserted into the clearances 472, the above position holding member extracting step, the above forward moving step, the above position holding member inserting step, the above pre-orientation member extracting step, and the above backward moving step are repeated.

Like this, the respective straight portions 431 in the straight overlap section 471 can be oriented in the overlap direction in advance by the pre-orientation members 81, and the size of the clearance between the adjacent straight overlap sections can be aligned in advance. Accordingly, in the wound body 48 obtained by winding this combined body 47, it is possible to improve the accuracy with which the respective straight portions 431 of the straight laminated section 481 are oriented in the radial direction of the wound body 48, and also to improve the pitch accuracy between the adjacent straight laminated sections 481.

Further, when the pre-orientation members 81 are in the state of being extracted from the clearances 472 of the combined body 47, the position holding members 91 are always inserted into other clearances 472, and the combined body 47 is positioned in place. That is, the extraction or insertion of the pre-orientation members 81 is performed with respect to the combined body positioned in place by the position holding members 91. Accordingly, the pre-orientation members 81 can be inserted into the next clearances 472 with ease.

Further, since the orientation accuracy of the straight portions 43 in the combined body 47 and the pitch accuracy can be increased in advance by the pre-orientation members 81, it is possible to further increase the orientation accuracy and the pitch accuracy by the orientation members 7.

Embodiment 2

The winding step in the stator coil manufacturing method of Embodiment 2 shown in FIG. 13 to FIG. 14 is a continuous winding step. In this continuous winding step, the combined body 47 is wound around the core member 6 while being sent continuously to the core member 6.

A plurality of the pre-orientation members 81 are made movable in synchronization with the sending direction of the combined body 47 in a belt-conveyor manner by a pair of sending rollers 85 while being guided by guide members 83. Further, the plurality of the pre-orientation members 81 are controlled in their forward and backward movements with respect to the clearances 472 of the combined body 47 by a pre-orientation member movement regulating member 84.

The pair of the sending rollers 85 is controlled by the control device together with respective orientation arrow driving device 75, a rotationally driving device of the core member 6 and the sending driving device of the combined body 47.

The pre-orientation members 81 have the same structure as those explained in Embodiment 1.

The pre-orientation member movement regulating member 84 includes an admission section, an orientation section and an exit section. The pre-orientation member movement regulating member 84 gradually moves the pre-orientation members 81 downward toward the sending direction of the combined body 47 at the admission section in order to gradually let the pre-orientation members 81 into the clearances 472 of the combined body 47.

The pre-orientation member movement regulating member 84 horizontally moves the pre-orientation members 81 kept being let completely into the clearances 472 at the orientation section. By this, the straight portions 431 in the straight overlap section 471 of the combined body 47 can be oriented in the radial direction within the area of this orientation section, and also to align the size of the interval between the straight overlap sections 471.

The pre-orientation member movement regulating member 84 gradually moves the pre-orientation member 81 upward toward the sending direction of the of the combined body 47, to let the pre-orientation members 81 exit from the clearances 472 of the combined body 47. After the pre-orientation members 81 exit from the clearances 472, the combined body 47 begins to be wound around the core member 6. Also, a pair of orientation arrows 74 as the orientation members 7 are inserted into the clearances 472 between the straight overlap sections 471 immediately after beginning to be wound around the core member 6.

As above, since the orientation accuracy of the straight portions 43 in the combined body 47 and the pitch accuracy are increased in advance by the pre-orientation members 81, it is possible to further increase the orientation accuracy by the alignment members 7 and the pitch accuracy.

Other structures and working effects are the same as Embodiment 1.

Other Embodiments

In Embodiments 1 and 2, although explanation has been made for an example in which a combination body is formed by joining the ends of two shaped bodies formed from two electric conductor wires, and 6 sets of the combination bodies are combined to one another to make the combined body 47, it is not exclusive.

For example, one combination body may be made of a first wire section and a second wire section independent from each other, the first wire section being formed from one electric conductor wire as one shaped body, the second wire section being formed from one electric conductor wire as one shaped body. Alternatively, one combination body may be made of a first wire section and a second wire section which are continuous to each other, by one shaped body formed from one electric conductive wire.

The invention claimed is:

1. A method of manufacturing a stator coil in which a plurality of phase windings are wound, comprising:
    a shaping step of shaping a plurality of shaped bodies from electric conductor wires;
    a combining step of combining said plurality of said shaped bodies to one another to form a combined body; and
    a winding step of winding said combined body around a core member to form a wound body;
    wherein
    said shaped body includes a plurality of straight portions extending in parallel to one another and aligned along a longitudinal direction of said combined body, and a plurality of turn portions each connecting adjacent ones of said straight portions at one end side and the other end side of said straight portions in an alternating manner,
    each of said shaped bodies including, in said longitudinal direction of said combined body, a plurality of straight overlap sections formed of said straight portions being overlapped,
    said wound body obtained at said winding step includes, in a circumferential direction of said wound body, a plurality of straight laminated sections formed of said plurality of said straight overlap sections laminated in a radial direction, and
    in said winding step, by inserting pre-orientation members respectively into consecutive ones of a plurality of clearances formed between said straight overlap sections adjacent to each other of said combined body during sending said combined body into said core member, overlap of said straight portions in said straight overlap section caught between said pre-orientation members is aligned.

2. The method of manufacturing a stator coil according to claim 1, wherein said winding step is a continuous winding step in which said combined body is continuously sent to said core member, and
    in said continuous winding step, said pre-orientation members are caused to enter and exit with respect to said clearances while being moved in synchronization with said combined body.

3. The method of manufacturing a stator coil according to claim 1, wherein said winding step is a pitch-by-pitch winding step to wind said combined body around said core member while sending said combined body to said core member by interval by interval between said adjacent straight overlap sections, and
    in said pitch-by-pitch winding step, there are repeatedly performed a pre-orientation member inserting step to insert said pre-orientation members into said clearances of said combined body at rest, a forward moving step to move forwardly said combined body together with said pre-orientation members by said interval between said adjacent straight overlap sections, a pre-orientation member extracting step to extract said pre-orientation members from said clearances of said combined body, and a backward moving step to move backward said pre-orientation members by said interval between said adjacent straight overlap sections.

4. The method of manufacturing a stator coil according to claim 3, wherein in said pitch-by-pitch winding step, a position holding member inserting step to insert position holding members into said clearances other than said clearances into which said pre-orientation members are inserted is performed after said forward moving step, a position holding member extracting step to extract said position holding members from said clearances of said combined body is performed after said pre-orientation member inserting step, said pre-orientation member extracting step, said backward moving step and said pre-orientation member inserting step are performed in a state that said position holding members are inserted into said clearances, and said forward moving step is performed in a state that said position holding members have been extracted from said clearances.

* * * * *